US012671349B2

(12) United States Patent
Pan et al.

(10) Patent No.: US 12,671,349 B2
(45) Date of Patent: Jun. 30, 2026

(54) METHOD FOR DC-BUS CAPACITANCE MINIMIZATION OF HYBRID CLAMPED CONVERTER

(71) Applicant: CHONGQING UNIVERSITY, Chongqing (CN)

(72) Inventors: Jianyu Pan, Chongqing (CN); Xiaojie Fu, Chongqing (CN); Yihui Zhao, Chongqing (CN)

( * ) Notice: Subject to any disclaimer, the term of this patent is extended or adjusted under 35 U.S.C. 154(b) by 183 days.

(21) Appl. No.: 18/663,133

(22) Filed: May 14, 2024

(65) Prior Publication Data

US 2024/0405698 A1 Dec. 5, 2024

(30) Foreign Application Priority Data

May 29, 2023 (CN) .......................... 202310615627.7

(51) Int. Cl.
| | |
|---|---|
| *H02M 7/538* | (2007.01) |
| *H02M 1/00* | (2007.01) |
| *H02M 7/483* | (2007.01) |
| *H02M 7/5387* | (2007.01) |

(52) U.S. Cl.
CPC ..... *H02M 7/53871* (2013.01); *H02M 1/0009* (2021.05)

(58) Field of Classification Search
CPC ........... H02M 7/53871; H02M 7/4837; H02M 7/483; H02M 7/487; H02M 7/5395; H02M 1/0095
See application file for complete search history.

(56) References Cited

U.S. PATENT DOCUMENTS

| | | | | | |
|---|---|---|---|---|---|
| 9,748,862 | B2 * | 8/2017 | Cheng | ................... | H02M 7/487 |
| 2019/0068080 | A1 * | 2/2019 | Wang | ................. | H02M 7/5395 |

FOREIGN PATENT DOCUMENTS

| | | | | | |
|---|---|---|---|---|---|
| CN | 114244165 | A | * | 3/2022 | ............... H02M 1/32 |
| CN | 116915078 | A | * | 10/2023 | .......... H02M 7/4837 |
| CN | 113489361 | B | * | 11/2023 | ........... H02M 7/487 |
| CN | 120301226 | A | * | 7/2025 | ............... H02J 3/38 |
| CN | 120855491 | A | * | 10/2025 | |

* cited by examiner

*Primary Examiner* — Sisay G Tiku

(57) ABSTRACT

The present invention provides a method for DC-bus capacitance minimization of hybrid clamped converter (HCC), which includes: obtaining the system parameters of the HCC during operation; determining the reference wave; determining the duty ratio of each switch according to the reference wave; determining the total neutral point current of the system; the fundamental component of the upper and lower DC-bus capacitor voltage of the system; determining the maximum voltage fluctuation of the upper and lower DC-bus capacitors; determining the minimum DC-bus capacitance value that satisfies the requirements of system capacitor voltage fluctuation by traversing the capacitance value. The present invention not only reduces the design complexity and cost of the high-power HCC system, but also improves the power density and reliability of the converter.

8 Claims, 3 Drawing Sheets

METHOD FOR DC-BUS CAPACITANCE MINIMIZATION OF HYBRID CLAMPED CONVERTER

TECHNICAL FIELD

The present invention relates to the field of power electronics technology, specifically to a method for DC-bus capacitance minimization of hybrid clamped converter (HCC).

BACKGROUND ART

Multilevel converter has been widely used in the industrial field, which has the advantages of smaller dv/dt, better harmonic performance, higher voltage levels, and higher power levels. However, the internal capacitor of the multilevel converter will be charged and discharged during the operation of the system, which will cause a certain voltage fluctuation in the capacitor. The problem of high voltage fluctuation on the capacitor of a multilevel converter under low-frequency conditions is usually solved by increasing the capacitance of the capacitor. However, for high-voltage capacitors, the volume and cost will increase significantly as the capacitance increases. Consequently, this will inevitably increase the system cost, reduce the system power density, and make the multilevel converter unable to meet the requirements of practical applications.

For the emerging medium and high voltage multilevel converter HCC, due to the existence of three DC-bus capacitors and three flying capacitors, it also has a complex capacitance minimization problem. When the DC-bus capacitor voltage fluctuation of HCC is effectively controlled, there is a complex relationship between the DC-bus capacitor voltage fluctuation, capacitor size, and system parameters of HCC. In recent years, much research has been carried out to solve many challenging problems such as HCC model construction, voltage balance control, integrated control, and soft start method. However, there are few studies on the DC-bus capacitance minimization problem of HCC, the lack of DC-bus capacitance minimization methods makes the design and parameter selection of DC-bus capacitors in high-power HCC systems extremely difficult.

Therefore, how to propose an effective design method for the DC-bus capacitance minimization of HCC, and quickly and effectively determine the minimum DC-bus capacitance of the system within the allowable capacitor voltage fluctuation range of the system is of great significance to the design of high-power HCC system.

SUMMARY

In view of this, the objective of the present invention is to provide an effective design method for DC-bus capacitance minimization of HCC. This present invention aims to solve the problem of the difficult selection of the HCC DC-bus capacitors. The DC-bus capacitance parameters for high-power HCC system can be quickly determined according to the design method for the DC-bus capacitance minimization of HCC proposed in this present invention.

To achieve the above objective, the present invention provides a design method for DC-bus capacitance minimization of HCC, including the following steps:

step 1: obtaining a DC-bus voltage $V_{dc}$, a reference wave frequency $f_{ac}$, a carrier frequency $f_c$, a modulation ratio $m_a$, a power factor $\cos \varphi$, a load impedance $Z$, and a system capacitor voltage fluctuation limit $\Delta V_{limit}$ when the HCC is operating;

step 2: determining a reference wave $$V'_{ref\_x}:$$

$$V'_{ref\_x} = V_{ref\_x} + V_{com} = \begin{cases} V_{ref\_a} + V_{com} = \dfrac{m_a}{2}\sin(2\pi f_{ac}t) + 0.5 + V_{com} \\ V_{ref\_b} + V_{com} = \dfrac{m_a}{2}\sin\left(2\pi f_{ac}t - \dfrac{2\pi}{3}\right) + 0.5 + V_{com} \\ V_{ref\_c} + V_{com} = \dfrac{m_a}{2}\sin\left(2\pi f_{ac}t - \dfrac{4\pi}{3}\right) + 0.5 + V_{com} \end{cases}$$

where, $V_{ref\_x}$ takes $V_{ref\_a}$, $V_{ref\_b}$, $V_{ref\_c}$, $V_{ref\_a}$, $V_{ref\_b}$, and $V_{ref\_c}$ denotes a reference wave of a-phase, b-phase, and c-phase, respectively; $V_{com}$ denotes a common-mode voltage;

step 3: determining a switch duty ratio $D_{Nx}$ of HCC according to the reference wave $$V'_{ref\_x}:$$

$$D_{Nx} = f\left(V'_{ref\_x}\right) = \begin{cases} 2V'_{ref\_x} & 0 \le V'_{ref\_x} \le 1/3 \\ 2/3 & 1/3 \le V'_{ref\_x} \le 2/3 \\ 2\left(1 - V'_{ref\_x}\right) & 2/3 \le V'_{ref\_x} \le 1 \end{cases}$$

step 4: determining a total neutral point current $i_N$ of the HCC system according to the switch duty ratio $D_{Nx}$ and a load current $i_{ox}$:

$$i_N = D_{Na}\,i_{oa} + D_{Nb}\,i_{ob} + D_{Nc}\,i_{oc}$$

where $D_{Nx}$ denotes a switch duty ratio of a-phase, b-phase or c-phase; $D_{Na}$ denotes the switch duty ratio of a-phase; $D_{Nb}$ denotes the switch duty ratio of b-phase; $D_{Nc}$ denotes the switch duty ratio of the c-phase; $i_{ox}$ denotes the load current of a-phase, b-phase or c-phase; $i_{oa}$ denotes the load current of a-phase; $i_{ob}$ denotes the load current of b-phase; $i_{oc}$ denotes the load current of c-phase;

step 5: determining a fundamental component $V_{cap}$ of the capacitors voltage of the upper and lower DC-bus of the system according to the total neutral point current $i_N$ of the system:

$$V_{cap} = \dfrac{\displaystyle\int_0^t i_N\,dt}{C_{dl}}$$

where $C_{dl}$ denotes a value of the DC-bus capacitance to be determined, the DC-bus capacitors are divided into three DC-bus capacitors: upper, middle, and lower, and the three capacitance values are equal.

step 6: determining a maximum voltage fluctuation $\Delta V_{cd1/cd3\_max}$ of upper and lower DC-bus capacitors according to $V_{cap}$:

$\Delta V_{cd1/cd3\_max} =$ $$\Delta V_{cd1/cd3\_f\_max} + \Delta V_{cd1/cd3\_h\_max} = \frac{\max(V_{cap}) - \min(V_{cap})}{2} + 3\Delta V_{cd2\_max}$$

where $\Delta V_{cd1/cd3\_f\_max}$ is the fundamental component of the maximum voltage fluctuation of the upper and lower DC-bus capacitors, $\Delta V_{cd1/cd3\_h\_max}$ is a harmonic component of the maximum voltage fluctuation of the upper and lower DC-bus capacitors; $\max(V_{cap})$ is a maximum value of the fundamental component of the upper and lower DC-bus capacitors voltage, and min $(V_{cap})$ is a minimum value of the fundamental component of the upper and lower DC-bus capacitors voltage; $\Delta V_{cd2\_max}$ is a maximum voltage fluctuation of the middle DC-bus capacitor;

step 7: traversing the capacitance value $C_{d1}$ from 0 to $C_{max}$, a step length of the traversal is $M_1$, repeating the above-mentioned steps 1-6 to obtain the corresponding $\Delta V_{cd1/cd3\_max}$ of different capacitance values, and when the $\Delta V_{cd1/cd3\_max}$ is less than or equal to $\Delta V_{limit}$ for the first time, outputting the corresponding capacitance value, that is, a minimum DC-bus capacitance value satisfying the requirement of system capacitor voltage fluctuation.

Further, in step 1, the range of $\Delta V_{limit}$ is 0-100% of the rated operating value of the capacitor voltage, and the rated operating value of the capacitor voltage is ⅓ of the DC-bus voltage.

Further, in step 2, $$V_{com} = 0.25\square\frac{m_a}{2}\square\sin(2\square3f_{ac}\pi t).$$

Further, in step 4, the load current $i_{ox}$ satisfies $$\begin{cases} i_{oa} = I\sin(2\pi f_{ac}t - \varphi) \\ i_{ob} = I\sin\left(2\pi f_{ac}t - \varphi - \frac{2\pi}{3}\right), \\ i_{ob} = I\sin\left(2\pi f_{ac}t - \varphi - \frac{4\pi}{3}\right) \end{cases}$$

where I denotes a maximum load current amplitude, $$I = \frac{1}{2}\square\frac{m_a\square V_{dc}}{Z}.$$

Further, in step 6, $$\Delta V_{cd2\_max} = \frac{3\sqrt{3} - 2}{12}\square\frac{I\square T_c}{C_{d1}},$$

where $T_c$ is a reciprocal of the carrier frequency $f_c$.

Further, the maximum voltage fluctuation of the upper and lower DC-bus capacitors as the main reference for the DC-bus capacitance minimization.

Further, in step 7, $C_{max}$ is 0.001 mF to 100 mF, and the step length $M_1$ is 0.0001 mF to 5 mF.

Further, the method is applicable to a wide output current frequency 1-1000 Hz condition and a wide carrier frequency 500-10000 Hz condition.

Advantageous Effects of the Present Invention

1) The present invention provides a design method for DC-bus capacitance minimization of HCC, in which the minimum DC-bus capacitance that satisfies the voltage fluctuation demand of the HCC capacitor is obtained by direct calculation of the constructed mathematical model. It avoids the excessive large DC-bus capacitance and significantly reduces the design complexity and volume of the HCC system.

2) The present invention provides a design method for DC-bus capacitance minimization of HCC, which applies to wide frequency conditions, effectively solves the problem of selecting the minimum HCC DC-bus capacitance, which significantly reduces the design costs of a high-power HCC converter, and has application value in the fields of medium-high voltage power conversion and motor drive, etc.

Additional advantages, objects, and features of the present invention will be set forth in part in the description that follows and in part will become apparent to those having ordinary skill in the art upon examination of the following or may be learned from practice of the invention. The objectives and other advantages of the present invention will be realized and attained by the following specifications.

DETAILED DESCRIPTION OF THE EMBODIMENTS

To make the technical solution, advantages, and objective of the present invention clearer, the following will describe the technical scheme of the example of the present invention clearly and completely in combination with the attached diagram of the example of the present invention. Obviously, the example described is part of the example of the present invention, not the whole example. Based on the described example of the present invention, all other examples obtained by ordinary technicians in this field without the need for creative labor are within the scope of protection of this application.

The present invention will be further elaborated hereafter in conjunction with accompanying drawings and examples.

Figure 2:
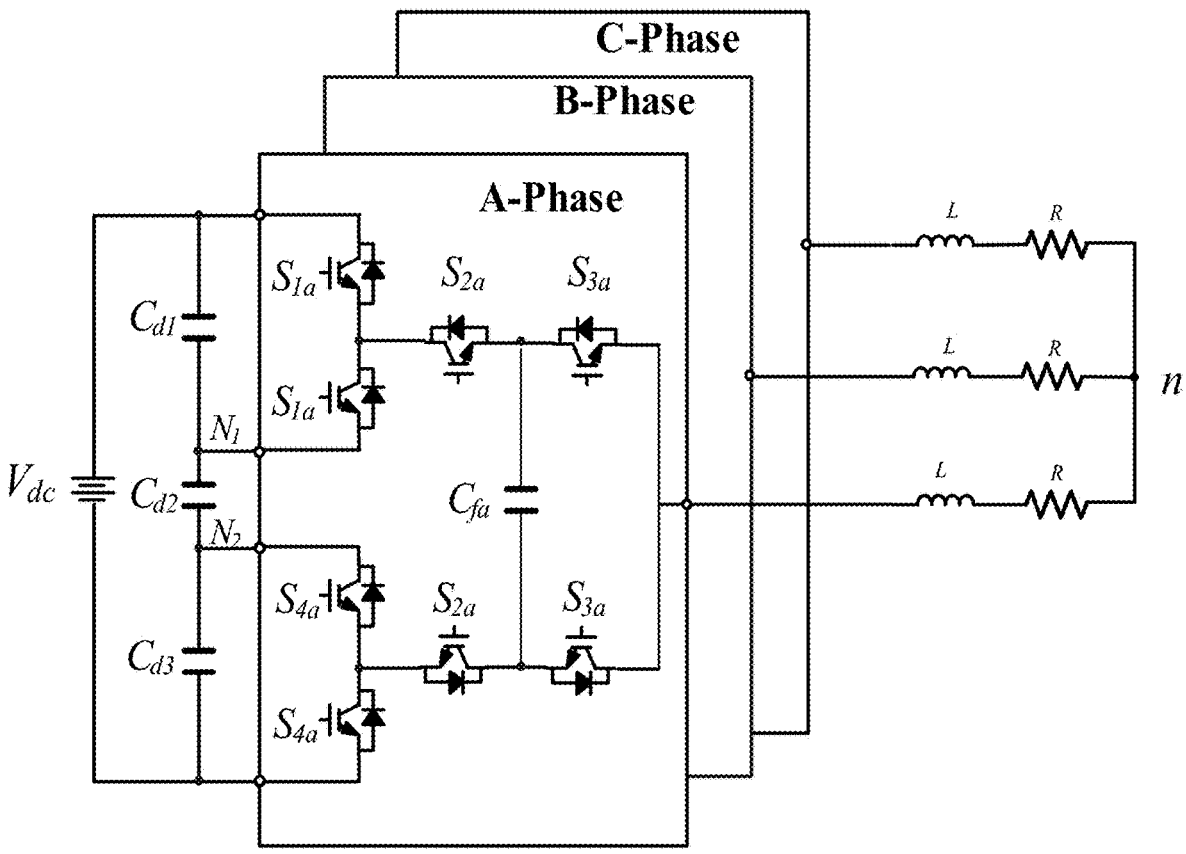
FIG. 2 is a schematic diagram of a three-phase four-level HCC circuit.

FIG. 2 is a schematic diagram of a three-phase four-level HCC circuit connection. As shown in FIG. 2, the circuit includes a DC power supply $V_{dc}$, a three-phase HCC, and a three-phase load Z (each phase includes a series resistance R and an inductance L). Wherein, the three-phase is a-phase, b-phase, and c-phase, respectively (also can be written as A-phase, B-phase, and C-phase).

The three-phase HCC includes three series DC-bus capacitors $C_{d1}$, $C_{d2}$, and $C_{d3}$, three flying capacitor $C_{fa}$ (corresponding to a-phase), $C_{fb}$ (corresponding to b-phase), and Cfc (corresponding to c-phase), and three bridge arms, each bridge arm contains four sets of switches. Wherein, the DC-bus capacitor $C_{d1}$ can also be called the upper DC-bus capacitor, the DC-bus capacitor $C_{d3}$ can also be called the lower DC-bus capacitor, and the DC-bus capacitor $C_{d2}$ can also be called the middle DC-bus capacitor.

For any x-phase (a-phase, b-phase or c-phase), it corresponds to the flying capacitor $C_{fx}$ and the bridge arm switches $S_{1x}$ and $S_{1x}'$, $S_{2x}$ and $S_{2x}'$, $S_{3x}$ and $S_{3x}'$, $S_{4x}$ and $S_{4x}'$. For example, as shown in FIG. 2, for a-phase, it corresponds to the flying capacitor $C_{fa}$ and the bridge arm switches $S_{1a}$ and $S_{1a}'$, $S_{2a}$ and $S_{2a}'$, $S_{3a}$ and $S_{3a}'$, $S_{4a}$ and $S_{4a}'$. Wherein, a first end of Sla is connected to the positive electrode of the DC-bus capacitor $C_{d1}$, a second end of $S_{1a}$ is connected to a first end of $S_{1a}'$ and a first end of $S_{2a}$, a first end of $S_{1a}'$ is also connected to the first end of $S_{2a}$, a second end of $S_{1a}'$ is connected to the negative electrode of the DC-bus capacitor $C_{d1}$, a second end of $S_{2a}$ is connected to a first end of $S_{3a}$, a first end of $S_{4a}$ is connected to the positive electrode of the DC-bus capacitor $C_{d3}$, a second end of $S_{4a}$ is connected to a first end of $S_{2a}'$ and a first end of $S_{4a}'$, a second end of $S_{4a}'$ is connected to the negative electrode of the DC-bus capacitor $C_{d3}$, a second end of $S_{2a}'$ is connected to a first end of $S_{3a}'$, a second end of $S_{3a}$ and a second end of $S_{3a}'$ are connected to the load, the second end of $S_{2a}$ and the first end of $S_{3a}$ are connected to the positive electrode of the flying capacitor $C_{fa}$, and the second end of $S_{2a}'$ and the first end of $S_{3a}'$ are connected to the negative electrode of the flying capacitor $C_{fa}$.

It should be noted that only a specific connection mode of a-phase is shown in FIG. 2, and the specific connection mode of the b-phase and c-phase is not shown. For technicians in this field, according to FIG. 2 and the above description, it is easy to understand that the specific connection mode of the b-phase and c-phase is similar to that of a-phase, and will not described in detail here.

Figure 1:
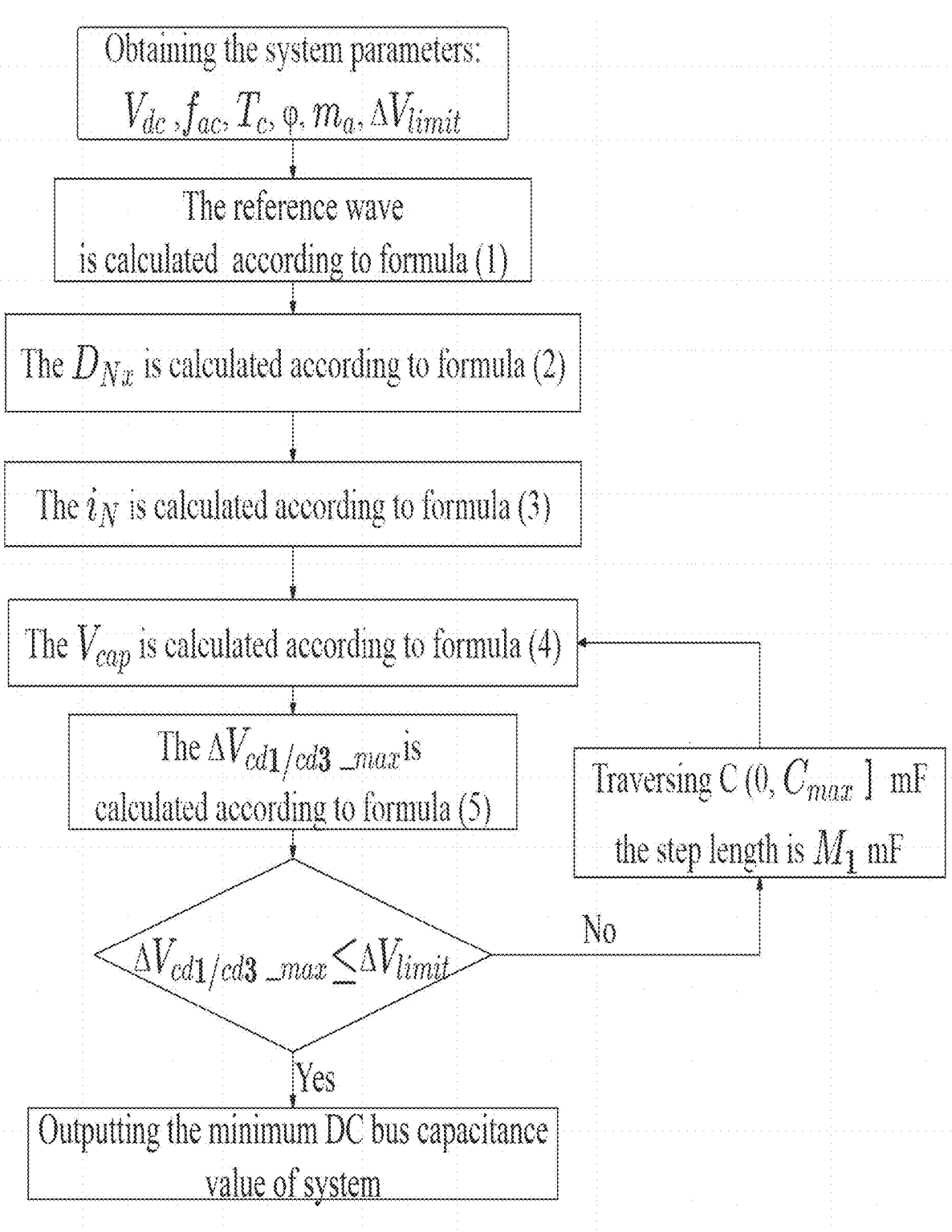
FIG. 1 is a flow chart of the design method for the DC-bus capacitance minimization of the HCC in the present invention.

FIG. 1 is a flow chart of the design method for DC-bus capacitance minimization of HCC in the present invention. As shown in FIG. 1, including:

step 1: the DC-bus voltage $V_{dc}$, the reference wave frequency $f_{ac}$, the carrier frequency $f_c$, the modulation ratio $m_a$, the power factor $\cos \varphi$, the load impedance Z, and the system capacitor voltage fluctuation limit $\Delta V_{limit}$ are obtained when the HCC is operating; wherein, the capacitor voltage fluctuation limit $\Delta V_{limit}$ is the maximum DC-bus capacitor voltage fluctuation allowed by the system, the range of $\Delta V_{limit}$ is generally 0-100% of the rated operating value of the capacitor voltage, and the rated operating value of the capacitor voltage is ⅓ of the DC-bus voltage.

step 2: the reference wave $$V'_{ref\_x}$$

is determined according to formula (1):

$$V'_{ref\_x} =$$

$$V_{ref\_x} + V_{com} = \begin{cases} V_{ref\_a} + V_{com} = \dfrac{m_a}{2}\sin(2\pi f_{ac}t) + 0.5 + V_{com} \\ V_{ref\_b} + V_{com} = \dfrac{m_a}{2}\sin\left(2\pi f_{ac}t - \dfrac{2\pi}{3}\right) + 0.5 + V_{com} \\ V_{ref\_c} + V_{com} = \dfrac{m_a}{2}\sin\left(2\pi f_{ac}t - \dfrac{4\pi}{3}\right) + 0.5 + V_{com} \end{cases} \quad (1)$$

where, $V_{ref\_x}$ takes $V_{ref\_a}$, $V_{ref\_b}$, $V_{ref\_c}$, $V_{ref\_a}$, $V_{ref\_b}$, and $V_{ref\_c}$ denotes the reference wave of a-phase, b-phase, and c-phase, respectively; $V_{com}$ denotes the common-mode voltage;

In some examples, $V_{com}$ satisfies $$V_{com} = 0.25\square\frac{m_a}{2}\square\sin(2\square 3f_{ac}\pi t),$$

that is, the minimization design method is implemented on the basis of the 25% amplitude frequency tripling common-mode voltage injection control method. In other examples, the amplitude of 25% can also be any other appropriate value.

step 3: the reference wave $$V'_{ref\_x}$$

is substituted into formula (2) to determine the switch duty ratio $D_{Nx}$ of HCC:

$$D_{Nx} = f(V'_{ref\_x}) = \begin{cases} 2V'_{ref\_x} & 0 \le V'_{ref\_x} \le 1/3 \\ 2/3 & 1/3 \le V'_{ref\_x} \le 2/3 \\ 2(1 - V'_{ref\_x}) & 2/3 \le V'_{ref\_x} \le 1 \end{cases} \quad (2)$$

where the switch duty ratio $D_{Nx}$ of HCC denotes the duty ratio of the switch $(S_{1x} \oplus S_{2x})$, $S_{1x}$ and $S_{2x}$ denotes the on-off state of HCC internal switch $S_{1x}$ and $S_{2x}$, respectively, x is a-phase, b-phase or c-phase, the switch on is 1, and the switch off is 0; $\oplus$ denotes an XOR operation.

step 4: the total neutral point current $i_N$ of the system is determined according to the switch duty ratio $D_{Nx}$ and the load current $i_{ox}$, the specific calculation method such as formula (3):

$$i_N = D_{Na}\square i_{oa} + D_{Nb}\square i_{ob} + D_{Nc}\square i_{oc} \quad (3)$$

where $D_{Nx}$ denotes the switch duty ratio of a-phase, b-phase or c-phase; $D_{Na}$ denotes the switch duty ratio of a-phase; $D_{Nb}$ denotes the switch duty ratio of b-phase; $D_{Nc}$ denotes the switch duty ratio of the c-phase; $i_{ox}$ denotes the load current of a-phase, b-phase or c-phase; $i_{oa}$ denotes the load current of a-phase; $i_{ob}$ denotes the load current of b-phase; $i_{oc}$ denotes the load current of c-phase;

in some examples, the load current $i_{ox}$ satisfies the following formula:

$$\begin{cases} i_{oa} = I\sin(2\pi f_{ac}t - \varphi) \\ i_{ob} = I\sin\left(2\pi f_{ac}t - \varphi - \dfrac{2\pi}{3}\right), \\ i_{ob} = I\sin\left(2\pi f_{ac}t - \varphi - \dfrac{4\pi}{3}\right) \end{cases}$$

where the maximum load current amplitude I satisfies $$I = \frac{1}{2} \square \frac{m_a \square V_{dc}}{Z}.$$

Step 5: the fundamental component $V_{cap}$ of the capacitor voltages of the upper and lower DC-bus of the system is determined according to the total neutral point current $i_N$ of the system, the specific calculation method such as formula (4):

$$V_{cap} = \frac{\int_0^t i_N \, dt}{C_{d1}} \qquad (4)$$

where $C_{d1}$ denotes a value of the DC-bus capacitance to be determined, where the DC-bus capacitors is divided into three DC-bus capacitors: upper, middle, and lower, and the three capacitance values are equal.

Step 6: the maximum voltage fluctuation $\Delta V_{cd1/cd3\_max}$ of upper and lower DC-bus capacitors is determined according to $V_{cap}$, the specific calculation method such as formula (5):

$$\Delta V_{cd1/cd3\_max} = \qquad (5)$$

$$\Delta V_{cd1/cd3\_f\_max} + \Delta V_{cd1/cd3\_h\_max} = \frac{\max(V_{cap}) - \min(V_{cap})}{2} + 3\Delta V_{cd2\_max}$$

where $\Delta V_{cd1/cd3\_f\_max}$ is the fundamental component of the maximum voltage fluctuation of the upper and lower DC-bus capacitors; $\Delta V_{cd1/cd3\_h\_max}$ is the harmonic component of the maximum voltage fluctuation of the upper and lower DC-bus capacitors; $\max(V_{cap})$ is the maximum value of the fundamental component of the upper and lower DC-bus capacitors voltage, and $\min(V_{cap})$ is the minimum value of the fundamental component of the upper and lower DC-bus capacitors voltage; $\Delta V_{cd2\_max}$ is the maximum voltage fluctuation of the middle DC-bus capacitor.

in some examples, $\Delta V_{cd2\_max}$ satisfies $$\Delta V_{cd2\_max} = \frac{3\sqrt{3} - 2}{12} \square \frac{I \square T_c}{C_{d1}}.$$

Step 7: the capacitance value $C_{d1}$ is traversed from 0 to $C_{max}$, the step length of the traversal is $M_1$, the above-mentioned steps 1-6 are repeated to obtain the corresponding $\Delta V_{cd1/cd3\_max}$ of different capacitance values, and when the $\Delta V_{cd1/cd3\_max}$ is less than or equal to $\Delta V_{limit}$ for the first time, a corresponding capacitance value is output, that is, a minimum DC-bus capacitance value satisfies the requirement of system capacitor voltage fluctuation. In some examples, $C_{max}$ is 0.001 mF to 100 mF, and the step length $M_1$ is 0.0001 mF to 5 mF.

In some examples, the maximum voltage fluctuation of the middle DC-bus capacitor is less than the maximum voltage fluctuation of the upper and lower DC-bus capacitors, and the maximum voltage fluctuation of the upper and lower DC-bus capacitors as the main reference for the DC-bus capacitance minimization.

The method provided by the present invention can be applied to a wide output current frequency 1-1000 Hz condition and a wide carrier frequency 500-10000 Hz condition.

Based on the effective suppression of DC-bus capacitor voltage fluctuation after common mode voltage injection, the present invention constructs an accurate correlation model of DC-bus capacitor voltage fluctuation and DC-bus capacitance value, and further proposes a design method for DC-bus capacitance minimization of HCC. By substituting the given system parameters into the proposed design method, the minimum DC-bus capacitance parameters of the HCC that meet the requirements of system voltage fluctuation can be obtained quickly and accurately, which reduces the cost, volume, and weight of the bus capacitor. The present invention not only reduces the design complexity and cost of the high-power HCC system, but also improves the power density and reliability of the converter.

The following is explained by specific examples.

Example 1 the proposed method for DC-bus capacitance minimization is used to design the minimum DC-bus capacitor of a specific three-phase HCC system, the specific parameters of the HCC system are as follows:

the DC power supply $V_{dc}$ is used to provide DC power supply voltage, and the voltage is 3.3 kV;

the modulation ratio of HCC system is 1, the reference wave frequency is 5 Hz, and the carrier frequency is 4 kHz;

the three-phase load is composed of three series resistors and inductors, the resistance of the load RL resistor is $8\Omega$, the inductance is 1 mH, and the system power factor is about 1;

the capacitor voltage fluctuation limit $\Delta V_{limit}$ of the HCC system is $\pm 10\%$ of the rated operating value of the capacitor voltage of 1100 V, which is 220 V;

the design method for DC-bus capacitance minimization of HCC in this example is shown in FIG. 1, the specific steps are as follows:

(1) the DC-bus voltage is 3.3 kV, the reference wave frequency is 5 Hz, the carrier frequency is 4 kHz, the modulation ratio is 1, the power factor is 1 and the system capacitor voltage fluctuation limit is 10% are obtained when the HCC is operating.

(2) the reference wave $$V'_{ref\_x}$$

is obtained according to formula (1), $$V'_{ref\_x} = V_{ref\_x} + V_{com} =$$

$$\begin{cases} V_{ref\_a} + V_{com} = 0.5\square\sin(10\pi t) + 0.5 + 0.125\square\sin(30\pi t) \\ V_{ref\_b} + V_{com} = 0.5\square\sin\left(10\pi t - \frac{2\pi}{3}\right) + 0.5 + 0.125\square\sin(30\pi t) \\ V_{ref\_c} + V_{com} = 0.5\square\sin\left(10\pi t - \frac{4\pi}{3}\right) + 0.5 + 0.125\square\sin(30\pi t) \end{cases}$$

(3) the reference wave $$V'_{ref\_x}$$

is substituted into formula (2) to obtain a switch duty ratio $D_{Nx}$ of HCC, $$D_{Nx} = f(V'_{ref\_x}) = \begin{cases} 2V'_{ref\_x} & 0 \le V'_{ref\_x} \le 1/3 \\ 2/3 & 1/3 \le V'_{ref\_x} \le 2/3 \\ 2(1 - V'_{ref\_x}) & 2/3 \le V'_{ref\_x} \le 1 \end{cases}$$

(4) the switch duty ratio $D_{Nx}$ and the load current $i_{ox}$ are substituted into formula (3) to obtain the total neutral point current of the system, $$i_N = D_{Na} \square i_{oa} + D_{Nb} \square i_{ob} + D_{Nc} \square i_{oc}$$

where the load current satisfies $$\begin{cases} i_{oa} = I\sin(10\pi t - \varphi) \\ i_{ob} = I\sin\left(10\pi t - \varphi - \dfrac{2\pi}{3}\right) \\ i_{ob} = I\sin\left(10\pi t - \varphi - \dfrac{4\pi}{3}\right) \end{cases},$$

the maximum load current is $$I = \frac{1}{2} \square \frac{m_a \square V_{dc}}{Z} = 206 \, A.$$

(5) the total neutral point current $i_N$ of the system is substituted into formula (4) to obtain the fundamental component of the upper and lower DC-bus capacitors voltages $V_{cap}$, $$V_{cap} = \frac{\int_0^t i_N \, dt}{C_{d1}}$$

(6) V cap is substituted into formula (5) to obtain the maximum voltage fluctuation of upper and lower DC-bus capacitors, $$\Delta V_{cd1/cd3\_max} =$$

$$\Delta V_{cd1/cd3\_f\_max} + \Delta V_{cd1/cd3\_h\_max} = \frac{\max(V_{cap}) - \min(V_{cap})}{2} + 3\Delta V_{cd2\_max}$$

where $\Delta V_{cd1/cd3\_f\_max}$ is the fundamental component of the maximum voltage fluctuation of the upper and lower DC-bus capacitors; $\Delta V_{cd1/cd3\_h\_max}$ is the harmonic component of the maximum voltage fluctuation of the upper and lower DC-bus capacitors; $\Delta V_{cd2\_max}$ is the maximum voltage fluctuation of the middle DC-bus capacitor, which satisfies $$\Delta V_{cd2\_max} = \frac{3\sqrt{3} - 2}{12} \square \frac{I \square T_c}{C_{d1}} = \frac{3\sqrt{3} - 2}{12} \square \frac{0.052}{C_{d1}}.$$

(7) the capacitance value is traversed from 0 to 10 mF, the step length of the traversal is 0.01 mF, and the above-mentioned steps 1-6 are repeated to obtain the corresponding $\Delta V_{cd1/cd3\_max}$ of different capacitance values, it is judged that when the $\Delta V_{cd1/cd3\_max}$ is less than or equal to 220 V for the first time, the corresponding capacitance value 0.27 mF is output, that is, the minimum DC-bus capacitance value satisfies the requirement of system capacitor voltage fluctuation is 0.27 mF.

Through the above method, the minimum DC-bus capacitance value of HCC system is 0.27 mF when the capacitor voltage fluctuation limit $\Delta V_{limit}$ is +10% of the rated operating value of the capacitor voltage.

Figure 3:
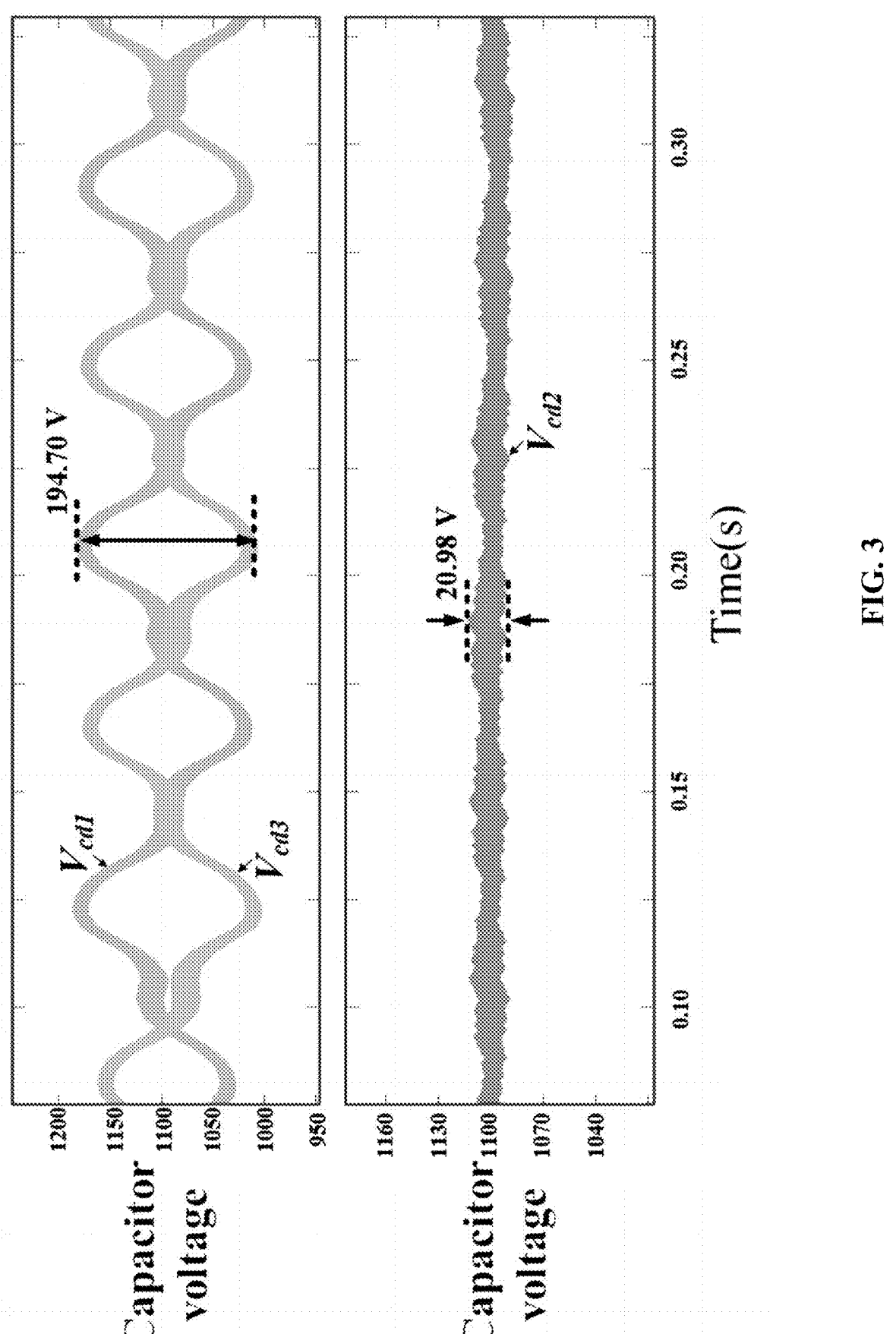
FIG. 3 is a simulation waveform diagram of each DC-bus capacitor voltage of the HCC system under the DC-bus capacitor parameters obtained by using the design method of the present invention.

FIG. 3 is a simulation waveform diagram of each DC-bus capacitor voltage of the HCC system under the 0.27 mF bus capacitor parameters obtained by using the design method for DC-bus capacitance minimization of the present invention.

From the analysis of FIG. 3, it can be seen that when the minimum DC-bus capacitance of 0.27 mF obtained by the design method for DC-bus capacitance minimization provided by the present invention is applied, the peak value of the middle DC capacitor voltage is 20.98 V, which is less than the voltage fluctuation of the upper and lower DC-bus capacitors. The peak value of the voltage fluctuation of the upper and lower DC-bus capacitors is 194.70 V, and the fluctuation is ±8.9% of the rated operating value of the capacitor voltage. In the actual selection of capacitance value, it is often considered to leave a certain margin, so as to avoid the fluctuation of capacitance voltage in extreme cases beyond the allowable range of the system. The difference between the actual HCC capacitor voltage fluctuation and the maximum allowable fluctuation under the minimum capacitance value obtained by the invention is within 2%, and a more accurate calculation of the minimum DC-bus capacitance value is realized.

In summary, the design method for DC-bus capacitance minimization of HCC provided by the invention directly calculates the minimum DC-bus capacitance parameters satisfying the voltage fluctuation requirement of the HCC capacitance through the constructed mathematical model, which significantly reduces the design complexity and volume of the HCC system. The present invention is applicable to wide-frequency conditions, effectively solves the problem of selecting the minimum HCC DC-bus capacitance under common conditions, and has the value of popularization and application in the fields of medium and high voltage power conversion and motor drive.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A method for DC-bus capacitance minimization of hybrid clamped converter (HCC), comprising following steps:

step 1: obtaining a DC-bus voltage $V_{dc}$, a reference wave frequency $f_{ac}$, a carrier frequency $f_c$, a modulation ratio $m_a$, a power factor cos $\varphi$, a load impedance Z, and a limit $\Delta V_{limit}$ of a system capacitor voltage fluctuation when the HCC is operating;

step 2: determining a reference wave $$V'_{ref\_x}:$$

$$V'_{ref\_x} = V_{ref\_x} + V_{com} = \begin{cases} V_{ref\_a} + V_{com} = \dfrac{m_a}{2}\sin(2\pi f_{ac}t) + 0.5 + V_{com} \\[2mm] V_{ref\_b} + V_{com} = \dfrac{m_a}{2}\sin\left(2\pi f_{ac}t - \dfrac{2\pi}{3}\right) + 0.5 + V_{com} \\[2mm] V_{ref\_c} + V_{com} = \dfrac{m_a}{2}\sin\left(2\pi f_{ac}t - \dfrac{4\pi}{3}\right) + 0.5 + V_{com} \end{cases}$$

wherein, $V_{ref\_x}$ takes $V_{ref\_a}$, $V_{ref\_b}$, $V_{ref\_c}$, $V_{ref\_a}$, $V_{ref\_b}$, and $V_{ref\_c}$ denote a reference wave of a-phase, b-phase, and c-phase, respectively; $V_{com}$ denotes a common-mode voltage;

step 3: determining a switch duty ratio $D_{Nx}$ of the HCC according to the reference wave $$V'_{ref\_x}:$$

$$D_{Nx} = f(V'_{ref\_x}) = \begin{cases} 2V'_{ref\_x} & 0 \le V'_{ref\_x} \le 1/3 \\[2mm] 2/3 & 1/3 \le V'_{ref\_x} \le 2/3 \\[2mm] 2(1 - V'_{ref\_x}) & 2/3 \le V'_{ref\_x} \le 1 \end{cases}$$

step 4: determining a total neutral point current $i_N$ of a system according to the switch duty ratio $D_{Nx}$ and a load current $i_{ox}$:

$$i_N = D_{Na} \cdot i_{oa} + D_{Nb} \cdot i_{ob} + D_{Nc} \cdot i_{oc}$$

wherein $D_{Nx}$ denotes a switch duty ratio of a-phase, b-phase or c-phase; $D_{Na}$ denotes the switch duty ratio of a-phase; $D_{Nb}$ denotes the switch duty ratio of b-phase; $D_{Nc}$ denotes the switch duty ratio of the c-phase; $i_{ox}$ denotes the load current of a-phase, b-phase or c-phase; $i_{oa}$ denotes the load current of a-phase; $i_{ob}$ denotes the load current of b-phase; $i_{oc}$ denotes the load current of c-phase;

step 5: determining a fundamental component $V_{cap}$ of capacitors voltage of upper and lower DC-bus of the system according to the total neutral point current $i_N$ of the system:

$$V_{cap} = \frac{\int_0^t i_N \, dt}{C_{d1}}$$

wherein $C_{d1}$ denotes a value of a DC-bus capacitance to be determined, DC-bus capacitors are divided into three DC-bus capacitors: an upper DC-bus capacitor, a middle DC-bus capacitor, and a lower DC-bus capacitor, and capacitance values of the three DC-bus capacitors are equal;

step 6: determining a maximum voltage fluctuation $\Delta V_{cd1/cd3\_max}$ of upper and lower DC-bus capacitors according to $V_{cap}$:

$$\Delta V_{cd1/cd3\_max} =$$

$$\Delta V_{cd1/cd3\_f\_max} + \Delta V_{cd1/cd3\_h\_max} = \frac{\max(V_{cap}) - \min(V_{cap})}{2} + 3\Delta V_{cd2\_max}$$

wherein $\Delta V_{cd1/cd3\_f\_max}$ is the fundamental component of the maximum voltage fluctuation of the upper and lower DC-bus capacitors; $\Delta V_{cd1/cd3\_h\_max}$ is a harmonic component of the maximum voltage fluctuation of the upper and lower DC-bus capacitors; $\max(V_{cap})$ is a maximum value of the fundamental component of voltage of the upper and lower DC-bus capacitors, and $\min(V_{cap})$ is a minimum value of the fundamental component of voltage of the upper and lower DC-bus capacitors; $\Delta V_{cd2\_max}$ is a maximum voltage fluctuation of the middle DC-bus capacitor; and step 7: traversing the value $C_{d1}$ from 0 to $C_{max}$, a step length of the traversing is $M_1$, repeating steps 1-6 to obtain a corresponding $\Delta V_{cd1/cd3\_max}$ of different capacitance values, and when the $\Delta V_{cd1/cd3\_max}$ is less than or equal to $V_{limit}$ for a first time, outputting a corresponding capacitance value, that is, a minimum DC-bus capacitance value satisfying a requirement of the system capacitor voltage fluctuation.

2. The method for DC-bus capacitance minimization of HCC according to claim 1, wherein in step 1, a range of $V_{limit}$ is 0-100% of a rated operating value of a capacitor voltage, and the rated operating value of the capacitor voltage is ⅓ of the DC-bus voltage.

3. The method for DC-bus capacitance minimization of HCC according to claim 1, wherein in step 2, $$V_{com} = 0.25 \cdot \frac{m_a}{2} \cdot \sin(2 \cdot 3 f_{ac}\pi t).$$

4. The method for DC-bus capacitance minimization of HCC according to claim 1, wherein in step 4, the load current $i_{ox}$ satisfies $$\begin{cases} i_{oa} = I\sin(2\pi f_{ac}t - \varphi) \\[2mm] i_{ob} = I\sin\left(2\pi f_{ac}t - \varphi - \dfrac{2\pi}{3}\right), \\[2mm] i_{ob} = I\sin\left(2\pi f_{ac}t - \varphi - \dfrac{4\pi}{3}\right) \end{cases}$$

wherein I denotes a maximum load current amplitude, $$I = \frac{1}{2} \cdot \frac{m_a \cdot V_{dc}}{Z}.$$

5. The method for DC-bus capacitance minimization of HCC according to claim 1, wherein in step 6, $$\Delta V_{cd2\_max} = \frac{3\sqrt{3} - 2}{12} \cdot \frac{I \cdot T_c}{C_{d1}},$$

wherein $T_c$ is a reciprocal of the carrier frequency $f_c$.

6. The method for DC-bus capacitance minimization of HCC according to claim 1, the maximum voltage fluctuation of the upper and lower DC-bus capacitors as a main reference for the DC-bus capacitance minimization.

7. The method for DC-bus capacitance minimization of HCC according to claim 1, wherein in step 7, $C_{max}$ is 0.001 mF to 100 mF, and the step length $M_1$ is 0.0001 mF to 5 mF.

8. The method for DC-bus capacitance minimization of HCC according to claim 1, wherein the method is applicable to a wide output voltage current frequency 1-1000 Hz condition and a wide carrier frequency 500-10000 Hz condition.

\* \* \* \* \*